May 10, 1927.
C. E. SWENSON
PROPELLER SHAFT
Filed Dec. 30, 1925
1,627,936
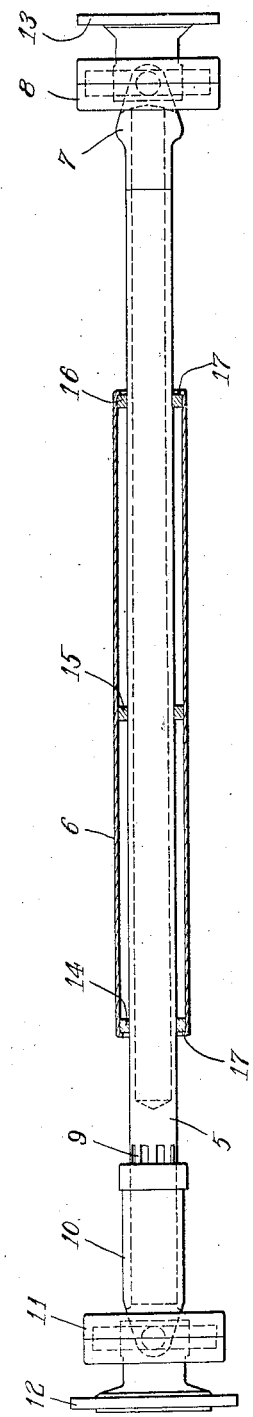
Inventor:
Carl E. Swenson
By Wilson + McCanna
Attys.

Patented May 10, 1927.

1,627,936

UNITED STATES PATENT OFFICE.

CARL E. SWENSON, OF ROCKFORD, ILLINOIS, ASSIGNOR OF ONE-FOURTH TO CARL L. ANDERSON, ONE-FOURTH TO LEVIN FAUST, AND ONE-FOURTH TO ERIC S. EKSTROM, ALL OF ROCKFORD, ILLINOIS.

PROPELLER SHAFT.

Application filed December 30, 1925. Serial No. 78,276.

This invention relates to propeller shafts for motor vehicles and has for its principal object the provision of a propeller shaft which practically eliminates bad effects from torsional vibration.

In recent years the matter of eliminating noise in transmissions has received considerable attention. Investigation has shown that the principal noises arise from a chattering of transmission gears against one another and also against the shafts on which they are mounted because of torsional vibration of the propeller shaft in conjunction with torsional vibrations in the engine crank shaft. Such vibration has been shown to be a function of the speed and torque and was introduced largely because of the shafts being too rigid and lacking in torsional flexibility. The prevailing practice in design has run toward generous diameters and sections to avoid any tendency to whip or vibrate excessively at high speeds. Shafts of the average length could not be used in smaller diameters without whipping and vibrating.

The present invention has for its object to obtain the torsional flexibility of a small diameter tubular or solid shaft and the stability or rigidity of a large diameter shaft by combining a tube of large diameter with a shaft of a smaller diameter where the tube serves to rigidify the shaft intermediate the ends thereof, while the shaft affords the desired torsional flexibility without involving whipping and vibration.

According to the present invention the small shaft is free to have considerable angular deflection with respect to the larger tube and at the same time is kept from bending because of its support in the tube which possesses the requisite rigidity. The large tube is secured against revolving around the small shaft at not more than one point of support.

The invention is illustrated in the accompanying drawing showing a propeller shaft and its universal joint connections, certain portions of the shaft being shown in section more clearly to illustrate its construction.

The shaft, as previously stated, comprises a small diameter tubular shaft 5 of the average length and an enclosing reenforcing or rigidifying large diameter tubular shaft 6. The shaft 5, which is comparatively smaller in diameter for its span than what the present prevailing practice in design would otherwise dictate, is jointed as indicated at 7 at its rear end with a universal joint 8 for transmitting power to the driven spindle in the rear axle housing of the motor vehicle on which the propeller shaft is mounted. The forward end of the shaft 5 is splined as indicated at 9 to be received within the slip yoke 10 of the front universal joint 11 to make connection with the gear set. The connections at the front and rear may be completed through the conventional flanges as shown at 12 and 13, respectively.

The shaft 5 is maintained in concentric spaced relation with the shaft 6 and also in mutual bearing relation therewith by means of a plurality of rings or collars 14, 15 and 16. These are preferably shrunk on the shaft 5 in the spaced relation shown but have a normal bearing fit within the tubular shaft 6 at two of the rings and a rigid connection at the other, as for example at the middle ring 15. Such connection may be by welding or any other suitable method. In this way the shaft 5 is capable of considerable angular deflection or twisting with respect to the shaft 6. At the same time the shaft 5 is made rigid at the intermediate portion thereof and will not sag or bend relative to the shaft 6. In other words, the shaft 5 is selected of a diameter to have the desired torsional flexibility whereas the shaft 6 is selected for its comparative rigidity. The tubular shaft 6 is held against endwise displacement from operative relation with the shaft 5 by the flanging inwardly of the opposite ends to envelop the outside faces of the rings 14 and 16 as shown at 17. It will be noted that the tubular shaft 6 is approximately equally spaced from the extremities of the shaft 5 and that the bearing afforded by the ring 15 is approximately at the middle of both of the shafts thus affording reenforcement at the most important point. The provision of the three spaced bearings, arranged as shown, maintains the relative flexible shaft 5 against sagging and consequent whipping and vibration in operation.

In operation the vibrations otherwise transmitted to the gear set from the propeller shaft are substantially eliminated. The torsional flexibility of the shaft 5 gives the desired smooth operation. The smallness in diameter to afford this characteristic would involve a shaft that would sag and cause whipping and vibration if it were not for the provision of the tubular reenforcement 6. In other words, the design affords the torsional flexibility of a small diameter tubular shaft combined with the comparative stability or rigidity of a large diameter shaft.

I claim:

1. A propeller shaft of the character described comprising in combination a relatively small diameter shaft of about the average length having power-transmitting connections at opposite ends, a comparatively large diameter tubular shaft surrounding an intermediate portion of the length of said first mentioned shaft, and a plurality of rings fixed on said first mentioned shaft in spaced relation and arranged to bear within said second named shaft, said second named shaft being held against endwise movement with respect to said rings.

2. A propeller shaft of the character described comprising in combination a relatively small diameter shaft of about the average length having power-transmitting connections at opposite ends, a comparatively large diameter tubular shaft surrounding an intermediate portion of the length of said first mentioned shaft, a plurality of spacing and bearing rings having a shrink fit on said first named shaft to be fixed thereon and turn therewith, said rings having a normal bearing contact within said second named shaft, and inturned flanges provided at the extremities of said second named shaft for retaining the same in operative relation to said first named shaft on said rings.

In witness of the foregoing I affix my signature.

CARL E. SWENSON.